United States Patent [19]

Takahashi

[11] Patent Number: 4,996,749

[45] Date of Patent: Mar. 5, 1991

[54] HOSE CLAMP

[75] Inventor: Yasuo Takahashi, Yokohama, Japan

[73] Assignee: Kato Hatsujo Kaisha, Ltd., Yokohama, Japan

[21] Appl. No.: 478,501

[22] Filed: Feb. 12, 1990

[30] Foreign Application Priority Data

Jun. 26, 1989 [JP] Japan .................................. 1-73495

[51] Int. Cl.$^5$ ............................................. B65D 63/02
[52] U.S. Cl. ................................ 24/20 R; 24/20 CW
[58] Field of Search ............ 24/20 R, 20 EE, 20 CW, 24/20 S, 23 EE, 23 W

[56] References Cited

U.S. PATENT DOCUMENTS

| 4,305,179 | 12/1981 | Sakurada | 24/20 R |
| 4,380,096 | 4/1983 | Nishida et al. | 24/20 R |
| 4,425,681 | 1/1984 | Illus . | |
| 4,773,129 | 9/1988 | Muhr | 24/20 R |
| 4,858,279 | 8/1989 | Kato et al. | 24/20 R |

FOREIGN PATENT DOCUMENTS

| 3041106 | 5/1982 | Fed. Rep. of Germany | 24/20 EE |
| 2470276 | 6/1981 | France | 24/20 R |
| 50-54611 | 5/1975 | Japan . | |
| 64-11496 | 1/1989 | Japan . | |
| 64-29590 | 2/1989 | Japan . | |
| 64-31286 | 2/1989 | Japan . | |
| 1560606 | 2/1980 | United Kingdom | 24/20 R |

Primary Examiner—Victor N. Sakran
Attorney, Agent, or Firm—Wenderoth, Lind & Ponack

[57] ABSTRACT

A hose clamp includes an annular clamp body having a pair of opposite end parts intersecting each other and bent in a radially outward direction so as to effect radial expansion of the clamp body by mutual approximation of the end parts. One of the end parts has a lock depression formed therein. The other end part has a lock claw part formed thereon at a position capable of engagement with the lock depression. The one end part has an unlocking wall formed thereon for disengaging the lock claw part from the lock depression. The clamp body is retained in a radially expanded state by the engagement between the lock claw part and the lock depression and is allowed to contract by the disengagement between the lock depression and the lock claw part.

3 Claims, 3 Drawing Sheets

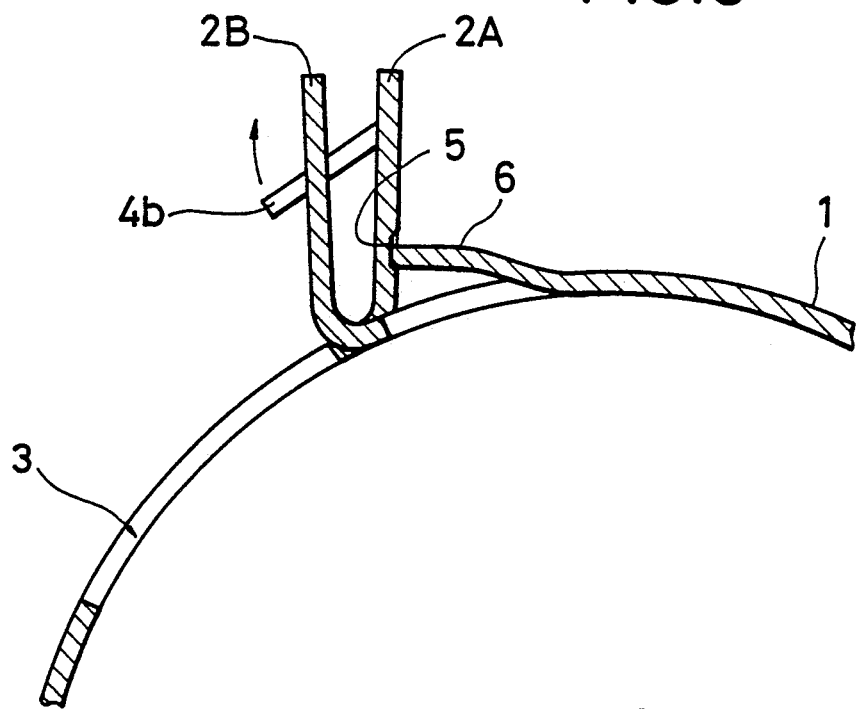
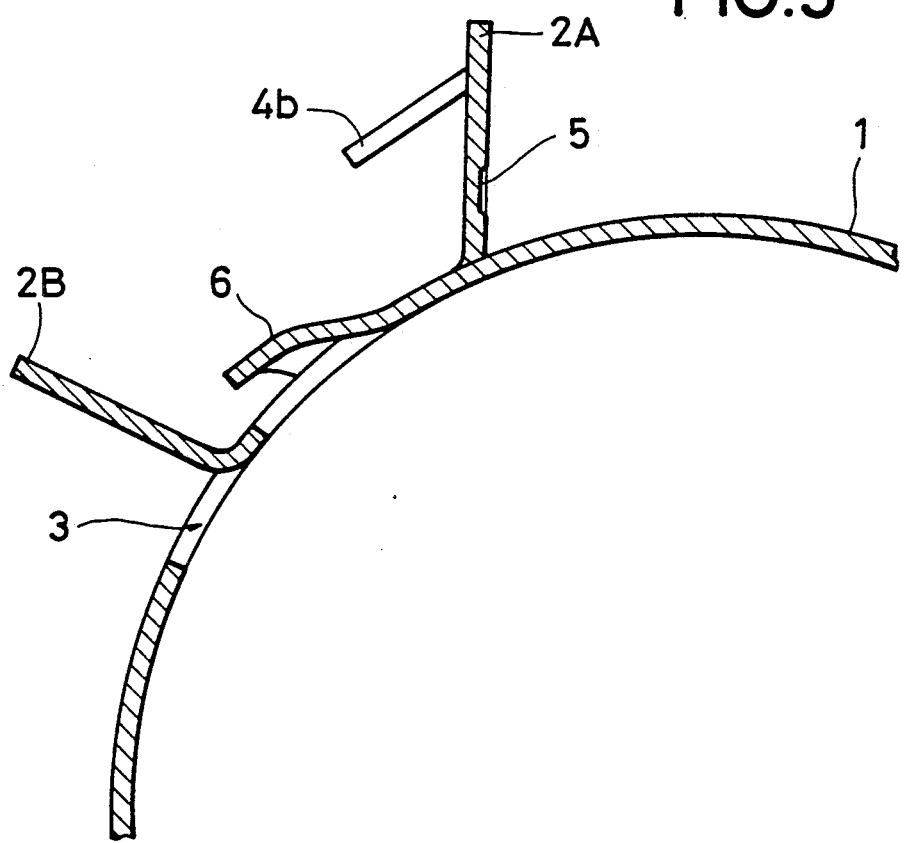

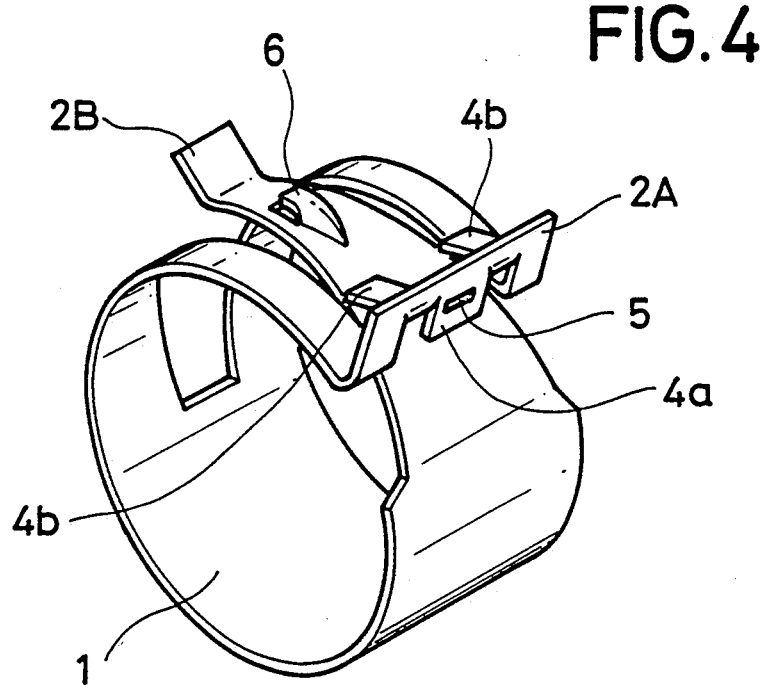
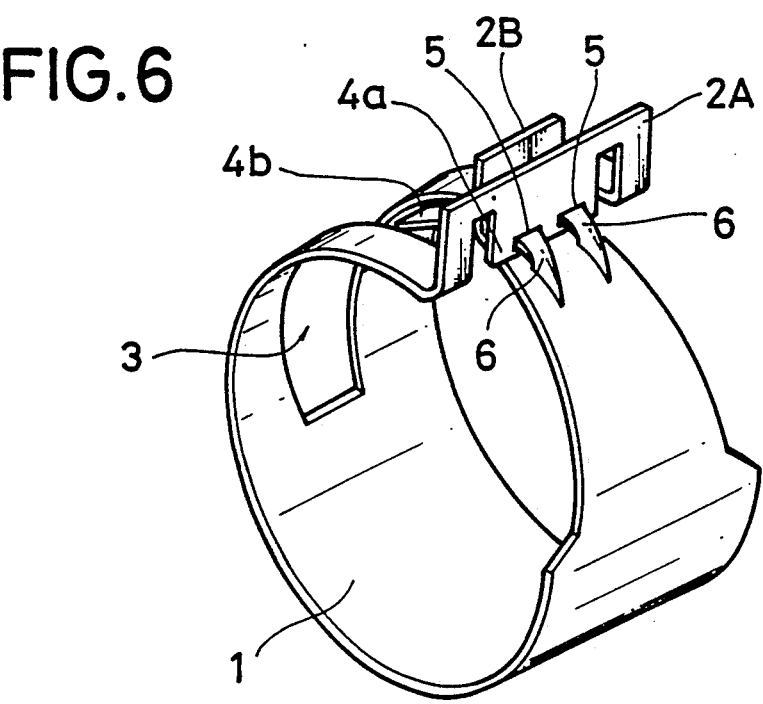

4,996,749

HOSE CLAMP

FIELD OF THE INVENTION AND RELATED ART STATEMENT

The present invention relates to a hose clamp capable of automatically clamping a rubber hose or the like.

As a representative of the hose clamps which have found unity to date, the hose clamp disclosed in U.S Pat. No. 4,305,179 may be cited. This prior art hose clamp is formed of one resilient metallic band cut in a prescribed shape, allowed to assume a very simple structure having the opposite ends of an annular clamp body bent outwardly in respectively radial directions in a mutually intersecting state, and adapted for the purpose of enabling the annular clamp body to be radially expanded by causing the bent ends to be nipped and brought toward each other by means of a nipping tool such as pliers. When this hose clamp is put to use, the field work for the insertion of a rubber hose inside the annular clamp body requires the clamp body to be radially expanded by bringing the folded ends toward each other by the use of the nipping tool each time the rubber hose is advanced inside the clamp body. In this respect, this hose clamp proves to be highly disadvantageous and inconvenient.

With a view to eliminating the disadvantage and inconvenience mentioned above, the hose clamp disclosed in Japanese Utility Model Public Disclosure No. 50-54611 has been proposed., This prior art hose clamp, by employing the structure of the aforementioned representative hose clamp as a prerequisite and being provided additionally with a holder of a U-shaped cross section capable of keeping the opposite bent ends close to each other, assume a structure which enables the clamp body to be kept radially expanded temporarily by capping the juxtaposed bent ends jointly with the holder and consequently holding the juxtaposed state of the bent ends fast against the resiliency of the clamp body. The prior art hose clamp provided with the holder, therefore, has an advantage that the work of inserting the rubber hose in the clamp body is extremely facilitated because the clamp body can be kept in a radially expanded state, if temporarily, by capping the juxtaposed bent ends with the holder and, at the same time, the clamp body can be automatically contracted radially and consequently allowed to clamp the rubber hose by its own resiliency by simply pulling the holder away from the bent ends.

Incidentally concerning the hose clamp provided with the holder, an improved hose clamp having a gripping piece integrally extended and adapted to facilitate the removal of the holder has been proposed as disclosed in Japanese Utility Model Public Disclosures No. 64-11496, No. 64-29590 and No. 64-31286, for example. However, since the improved hose clamps invariably use a separately molded holder as an essential component part, they inevitably entail an addition to the number of component parts and an increase of cost and often encounter possible misplacement of the holder. For a field workers, therefore, the presence of the holder itself has posed a new problem from the standpoint of use.

In view of the newly posed problem, a hose clamp of a type having no holder has been developed as disclosed in U.S. Pat. No. 4,425,681. This prior art hose clamp has a structure in which a substantially L-shaped lock wall consisting of a part extended in the radial direction and a part extended in the tangential direction is formed at one end part of the annular clamp body and, at the same time, an opening is formed in the radially extended part of the lock wall, a long guide groove is formed continuously from the opening to the clamp body, and the other end part of the clamp body is formed in a width small enough to travel through the opening and long guide groove and has the leading edge thereof bent upwardly in such a manner that the bent leading edge of the other end part is allowed to engage with the corresponding lock wall on the one end side mentioned above. In this prior art hose clamp, therefore, the clamp body can be kept in a radially expanded state by causing the bent leading edge of the other end part to slip into engagement with the L-shaped lock wall on the one end part instead of using any holder of the kind described above. After the clamp body has assumed this radially expanded state, the rubber hose is inserted through the radially expanded clamp body and the other end part of the clamp body is depressed downwardly with the tip of a simple tool such as a screwdriver to beak the engagement between the bent leading edge of the other end part and the lock wall. As a result, the other end part of the clamp body is caused to move past the opening of the lock wall along the long guide groove and the clamp body is allowed to contract radially by virtue of the resiliency of the clamp body itself. Thus, the hose clamp can automatically clamp the rubber hose.

Use of the hose clamp of the aforementioned structure first requires the clamp body in its free state to be set in its radially expanded state. In this hose clamp, the radial expansion of the clamp body can be indeed obtained by nipping the one end part and the other end part jointly with a nipping tool such as pliers. This nipping action is not sufficient for automatically bringing the bent leading edge of the other end part into engagement with the lock wall. The final engagement of the bent leading edge with the lock wall necessitates further complicated manual work. Thus, the hose clamp has a problem that the work for setting the clamp body in the radially expanded state is irksome. Moreover, the structure which attains the radially expanded state of the clamp body by setting the bent leading edge of the other end part into engagement with the L-shaped lock wall on the one end side further encounters a problem that an external force accidentally exerted on the hose clamp during the transportation or handling causes the bent leading edge of the other end part ot readily come off the lock wall on the one end side and the clamp body is suffered to contract radially. When the clamp body is radially contracted unintentionally, the bent leading edge of the other end part must be brought into engagement once again with the lock wall on the one end side. It goes without saying that again in this case, the work of resetting is irksome.

For the same purpose as that of U.S. Patent No. 4,425,681 described above, a hose clamp of the type disclosed in U.S. Pat. No. 4,773,129 has been developed. This prior art hose clamp has a structure in which a substantially U-shaped lock wall consisting of a part extended in the radial direction and a part folded back in the tangential direction is formed on one end part of the annular clamp body, a lock hole is bored in the leading end part of the lock wall, a long guide groove is formed continuously from the radially extended part of the lock wall to the clamp body, and the other end part side of the clamp body is formed in a width small enough to travel inside the long guide groove, and the leading edge of the other end part is bent in the radial direction. Thus, the clamp body of this prior art can be set in a radially expanded state by simply bringing the bent leading edge of the other end part into engagement with the lock hole of the lock wall without requiring use of any holder. The clamp body is allowed to contract radially by breading the engagement between the bent leading edge of the other end part side and the lock hole. Similarly to the hose clamp of U.S. Pat. No. 4,425,681, this prior art hose clamp is not free from the problem that the work of setting the clamp body in the radially expanded state is irksome.

OBJECT AND SUMMARY OF THE INVENTION

The primary object of the present invention is to provide a hose clamp which is capable of setting a clamp body very simply in a radially expanded state.

To attain the object, according to the present invention there is provided a hose clamp comprising an annular clamp body having a pair of opposite end parts intersecting each other and bent in a radially outward direction so as to effect radial expansion of the clamp body by mutual approximation of the end parts, one of the end parts having lock depression means with an opening formed therein, the other end part having lock claw means formed thereon at a position capable of engagement with the lock depression means, the one end part having unlocking means formed thereon for disengaging the lock claw means from the lock depression means, the clamp body being retained in a radially expanded state by the engagement between the lock depression means and the lock claw means and allowed to contract by the disengagement betweenm the lock depression means and the lock claw means. Furthermore, the one end part has vertical wall formed at the center thereof, the lock depression means is formed in the vertical wall, the unlocking means comprises a pair of unlocking walls formed on the one end part with the other end part intervening therebetween when the clamp body is retained in a radially expanded state so that the unlocking walls extend in a direction opposite to the opening direction of the lock depression means, and the lock claw means has a contour for facilitating sliding of a lower edge of the vertical wall on the lock claw means.

The above and other objects, characteristic features and advantages of the present invention will become more apparent to those skilled in the art as the disclosure is made in the following description of preferred embodiments of the invention as illustrated in the accompanying drawings.

BRIEF DESCRIPTION OF THE DRAWINGS

FIG. 3 is an enlarged cross section illustrating the essential part of the hose clamp in a radially expanded state.

FIG. 4 is a perspective view of the hose clamp held in a radially contracted state.

FIG. 5 is a enlarged cross section illustrating the essential part of the hose clamp in a radially contracted state.

FIG. 6 is a perspective view illustrating another embodiment of the hose clamp according to the present invention in a radially expanded state.

DETAILED DESCRIPTION OF THE PREFERRED EMBODIMENTS

Now, the present invention will be described in detail below with reference to the illustrated embodiments.

Figure 1:
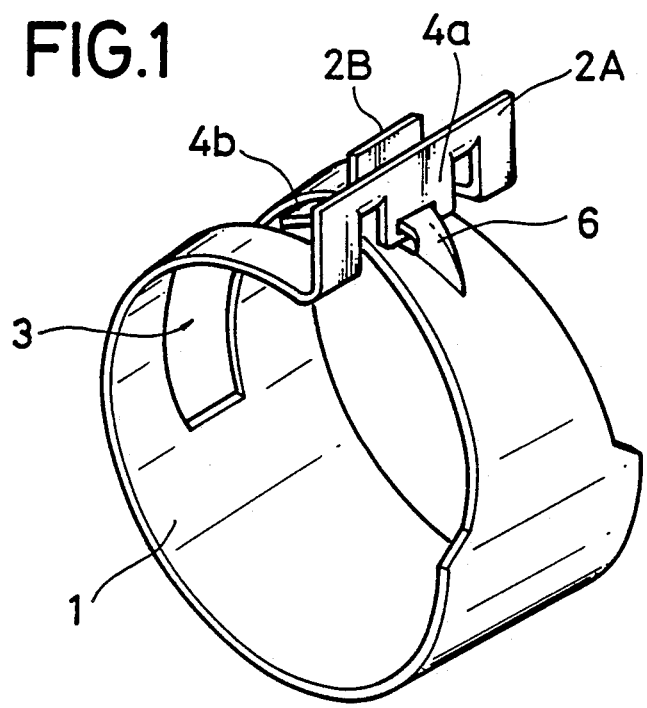
FIG. 1 is a perspective view illustrating one embodiment of the hose clamp according to the present invention kept in a radially expanded state and viewed from a position.
Figure 2:
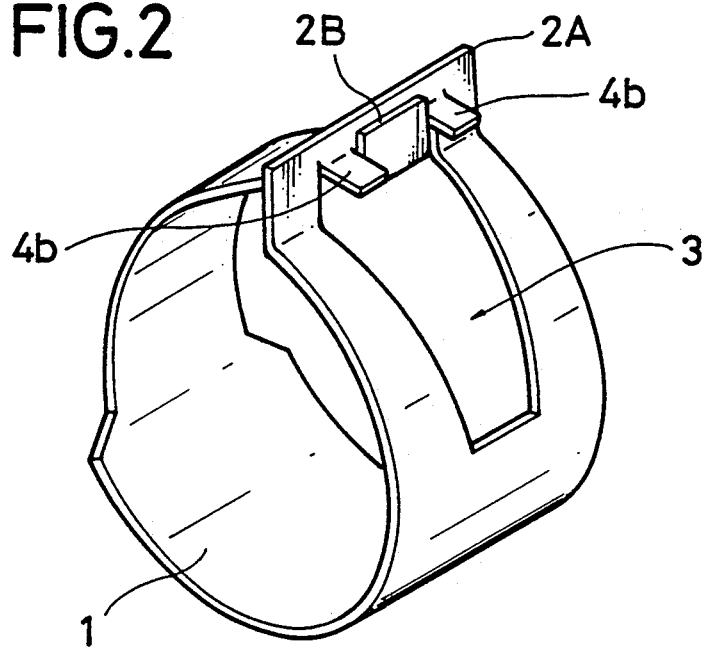
FIG. 2 is a perspective view illustrating the hose clamp kept in a radially expanded state and viewed from another position.

The hose clamp according to the present invention is formed of a resilient metallic band. More specifically, as illustrated in FIGS. 1 and 2, an annular clamp body 1 has opposite end parts 2A and 2B bent in a radially outward direction in such a manner as to intersect each other and has a long guide groove 3 formed therein to continue from one folded end part 2A of a large width in such a manner as to permit travel therein of the other bent end part 2B of a small width, so that the annular clamp body 1 is radially contracted by moving the other bent end part 2B inside the long guide groove 3 and consequently moving the two bent end parts 2A and 2B away from each other and so that the clamp body 1 is radially expanded by moving the two bent end parts 2A and 2B toward each other.

The folded end part 2A has a vertical wall 4a formed at the center thereof, a lock depression means 5 formed by pressing in one surface of the central vertical wall 4a so as to form 5a in the form of a lock an opening depression, and a pair of unlocking walls 4b formed on the opposite sides of the vertical wall 4a so as to project from the other surface of the vertical wall 4a and, when the clamp body 1 is retained in a radially expanded state, to allow the other bent end part 2B to intervene therebetween.

At a position near the bent end part 2B of the clamp body 1 there is formed by pressing a projecting lock claw part 6 adapted for engagement with the lock depression means 5. The clamp body 1 is kept in a radially expanded state by bringing the leading end of the lock claw part 6 into engagement with the lock depression means 5 and, by breading the engagement between the lock claw part 6 and the lock depression means 5, is automatically contracted radially. Furthermore, the lock claw part has a contour curved and gradually slanted upwardly in the direction of the leading end thereof so that the lower edge of the central vertical wall 4a is easily slid on the upper surface of the lock claw part 6.

When the hose clamp having the aforementioned structure is put to use, first the clamp body 1 in a free state has to be set in a radially expanded state. By nipping the two bent end parts 2A and 2B with a nipping tool such as pliers and approximating the two bent end parts 2A and 2B toward each other, the lower edge of the central vertical wall 4a formed on the side of the bent end part 2A is enabled to ride readily over the upper surface of the lock claw part 6 formed near the bent end part 2B and allow the lock claw part 6 to move immediately to the lock depression means 5 of the bent end part 2A, with the result that the lock claw part 6 is automatically engaged with the lock depression means 5, thus setting the clamp body 1 in a radially expanded state as illustrated in FIGS. 1 to 3.

In other words, by simply causing the two bent end parts 2A and 2B in a mutually intersecting state to approximate to each other, the bent end part 2A is enabled to ride readily over the curved upper surface of the lock claw part 6 and move the lock claw part 6 present on the side of the bent end part 2B to the side of the lock depression means 5 of the bent end part 2A and bring it into automatic engagement with the opening of the lock depression means 5. Thus, the clamp body 1 can be set very easily in a radially expanded state.

Moreover, while the clamp body 1 is in the radially expanded state as described above, the lock depression means 5 and the lock claw part 6 are in an infallibly engaged state because the leading end of the lock claw part 6 is engaged with the opening of the lock depression 5 in a matched projection-depression union. Therefore, even when the clamp body 1 is exposed accidentally to an external force in the course of transportation or handling, the hose clamp of the present invention precludes the breakage of the engaged state possibly encountered by conventional hose clamps. If the engaged state of the two component parts 5 and 6 should be broken by accident, it can be resumed by simply repeating the operation described above. This repeated operation can be carried out with little trouble on the part of the user.

For the clamp body 1 already set in the radially expanded state to clamp a given rubber hose (not shown), the rubber hose is inserted inside the clamp body 1, the unlocking walls 4b on the side of the bent end part 2A are forcibly lifted upwardly with finger tips or a simple tool, and the central vertical wall 4a having the lock depression means 5 formed therein is forcibly tilted in the direction of the lock claw part 6 and, as a result, the engagement of the lock claw part 6 with the lock depression means 5 is readily broken. By virtue of the resiliency of the material of the clamp body 1, the ben end part 2B is moved inside the long guide groove 3 and the clamp body 1 is immediately allowed to contract radially and automatically clamp the rubber hose as illustrated in FIGS. 4 and 5.

When the two bent end parts 2A and 2B keeping the rubber hose clamped therewith are approximated to each other, the clamp body 1 is forcibly expanded radially to permit free change in clamping position or permit itself to be set again for reuse.

The embodiment shown in FIGS. 1 to 5 has been described as being provided with one lock depression means 5 and one lock claw part 6 for the purpose of keeping the clamp body 1 in the radially expanded state.

The use of only one of these component parts 5 and 6 in one clamp body 1 is not critical. It is optional to use two or more lock depressions 5a in the lock depression means 5 and as many lock claw parts 6 to suit the occasion as illustrated in FIG. 6. Particularly when the number of the lock depressions 5a and that of the lock claw parts 6 are increased, the fastness with which the engaged state is obtained is proportionately improved.

As described above, the present invention is characterized by the fact that the opposite end parts of the annular clamp body are bent in the radially outward direction, that the lock depression means is formed on the side of one bent end part, and that the lock claw part for engagement with the lock depression means is formed at a position near the other end part of the clamp body. For the clamp body in a free state to be set for the first time or again in a radially expanded state, therefore, it suffices to nip the two bent end parts jointly with a nipping tool and approximate them to each other. Consequently, the clamp body can be very easily set in the radially expanded state because the lock claw part on the side of the other bent end part is enabled to move readily toward the side of the lock depression means of one bent end part and slip automatically into engagement with the opening of the lock depression means.

The hose clamp according to the present invention is very advantageous over the conventional countertype in respect that the operation of setting the clamp body in the radially expanded state is remarkably simplified.

Moreover, while the clamp body is in the radially expanded state, the lock claw part and the lock depression means are caused to remain in an infallibly engaged state because the leading end of the lock claw part is engaged with the interior of the lock depression in a matched projection-depression union. Even when the hose clamp is exposed to an external force by accident in the corse of transportation or handling, it can preclude the breakage of the engaged state possibly experienced by the conventional countertype.

What is claimed is:

1. A hose clamp comprising:
   an annular clamp body having a pair of opposite end parts intersecting each other and bent in a radially outward direction so as to effect radial expansion of said clamp body by mutual engagement of said end parts;
   one of said end parts having a vertical wall at the center thereof and having a lock depression means having an opening therein provided in said vertical wall;
   the other end part having lock claw means thereon at a position capable of engagement with said lock depression means, said lock claw means having a contour for facilitating sliding of a lower edge of said vertical wall on said lock claw means;
   said one end part having a pair of laterally spaced unlocking walls thereon for disengaging said lock claw means from said lock depression means with said other end part lying between said pair of unlocking walls when said clamp body is retained in a radially expanded state and said unlocking walls extending in a direction opposite to the opening direction of said lock depression means;
   said clamp body being retained in a radially expanded state by the engagement between said lock depression means and said lock claw means and allowed to contract upon the disengagement of said lock depression means and said lock claw means.

2. A hose clamp according to claim 1, wherein said lock claw means comprises a pair of lock claws and said lock depression means comprises a pair of lock depressions.

3. A hose clamp comprising:
   an annular clamp body having a pair of opposite end parts intersecting each other and bent in a radially outward direction so as to effect radial expansion of said clamp body by mutual engagement of said end parts;
   one of said end parts having lock depression means having a pair of lock depressions therein;
   the other end part having a pair of lock claws thereon at a position capable of engagement with said lock depressions when said clamp body is in a radially expanded state;
   said one end part having unlocking means thereon for disengaging said lock claws from said lock depressions;
   said clamp body being retained in a radially expanded state by the engagement between said lock depressions and said lock claws and allowed to contract upon the disengagement of said lock depressions and said lock claws.

* * * * *